US009488857B2

(12) United States Patent
Bornstein et al.

(10) Patent No.: US 9,488,857 B2
(45) Date of Patent: Nov. 8, 2016

(54) METHOD OF STRENGTHENING AN EDGE OF A GLASS SUBSTRATE (71) Applicant: Corning Incorporated, Corning, NY (US)

(72) Inventors: Kody Luce Bornstein, Bath, NY (US); Donald Arthur Clark, Corning, NY (US); Gregory Scott Glaesemann, Corning, NY (US); Gregory William Keyes, Rochester, NY (US); Jennifer Lynn Lyon, Painted Post, NY (US); Richard Curwood Peterson, Elmira Heights, NY (US); Shyamala Shanmugam, Painted Post, NY (US); Christopher Clark Thompson, Corning, NY (US); Krishna Hemanth Vepakomma, Painted Post, NY (US); Kathleen Ann Wexell, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/591,456

(22) Filed: Jan. 7, 2015

(65) Prior Publication Data
US 2015/0198838 A1 Jul. 16, 2015

Related U.S. Application Data (60) Provisional application No. 61/925,832, filed on Jan. 10, 2014, provisional application No. 61/973,504, filed on Apr. 1, 2014, provisional application No. 62/030,116, filed on Jul. 29, 2014.

(51) Int. Cl.
G02F 1/1333 (2006.01)
C03C 15/00 (2006.01)
(Continued)

(52) U.S. Cl.
CPC ......... *G02F 1/133308* (2013.01); *C03C 15/00* (2013.01); *C03C 17/32* (2013.01);
(Continued)

(58) Field of Classification Search
CPC .. G02F 1/133308; C03C 15/00; C03C 17/32
See application file for complete search history.

(56) References Cited

U.S. PATENT DOCUMENTS 5,022,735 A    6/1991   Dahlgren
5,157,751 A   10/1992   Maas et al.
(Continued)

FOREIGN PATENT DOCUMENTS

CN    103107086 B    3/2015
JP    2001098298 A    4/2001
(Continued)

OTHER PUBLICATIONS

PCT—Notification of transmittal of the international search report and the written opinion of the international searching authority—dated Mar. 20, 2015.
(Continued)

*Primary Examiner* — Mamadou Diallo
(74) *Attorney, Agent, or Firm* — Kevin M. Able (57) ABSTRACT

Methods of strengthening the edge surfaces of a glass substrate, and particularly glass substrates contained within a display panel, are disclosed. The methods include exposing edges of the display panel to an acid solution for a time and at a temperature effective to remove no more than about 20 micrometers of glass from edge surfaces, rinsing the acid solution from the edge and applying a polymer protective coating the rinsed edge to maintain the post-etching strength of the edge surfaces. Electronics on the display panel that may be exposed to the acid solution are masked with a terminal mask prior to the etching. The edge etching may be combined with etching of a surface of the display panel/cover glass substrate.

20 Claims, 9 Drawing Sheets (51) Int. Cl.
*C03C 17/32* (2006.01)
*C03C 27/10* (2006.01)

(52) U.S. Cl.
CPC ............ *C03C 27/10* (2013.01); *G02F 1/1333* (2013.01); *C03C 2218/118* (2013.01); *C03C 2218/34* (2013.01); *G02F 2001/133302* (2013.01); *G02F 2001/133325* (2013.01); *G02F 2001/133331* (2013.01)

(56) References Cited

U.S. PATENT DOCUMENTS

| | | | |
|---|---|---|---|
| 5,503,582 A | 4/1996 | Cathey, Jr. et al. ............ 445/24 | |
| 6,108,063 A | 8/2000 | Yuuki et al. | |
| 6,197,209 B1 | 3/2001 | Shin et al. | |
| 6,673,195 B2 | 1/2004 | Chen et al. | |
| 6,815,070 B1 | 11/2004 | Bürkle et al. ............. 428/425.6 | |
| 7,336,334 B2 | 2/2008 | Jung et al. | |
| 7,524,784 B2 | 4/2009 | Chacon et al. | |
| 8,066,898 B2 | 11/2011 | Kikuyama et al. | |
| 8,252,488 B2 | 8/2012 | Shiota | |
| 8,273,262 B2 | 9/2012 | Saijo et al. | |
| 2002/0067459 A1 | 6/2002 | Sugano | |
| 2003/0057183 A1 | 3/2003 | Cho et al. | |
| 2004/0004691 A1 | 1/2004 | Nakahara et al. | |
| 2004/0238487 A1 | 12/2004 | Kiehlbauch et al. | |
| 2005/0001201 A1 | 1/2005 | Bocko et al. | |
| 2005/0274950 A1 | 12/2005 | Hioki et al. | |
| 2007/0215835 A1 | 9/2007 | Kikuyama et al. | |
| 2008/0023438 A1 | 1/2008 | Nishino et al. | |
| 2009/0075486 A1 | 3/2009 | Kikuyama et al. | |
| 2009/0202727 A1 | 8/2009 | Abas et al. | |
| 2010/0003804 A1 | 1/2010 | Eguchi et al. | |
| 2010/0246016 A1 | 9/2010 | Carlson et al. | |
| 2010/0247044 A1 | 9/2010 | Noddings et al. | |
| 2011/0003619 A1 | 1/2011 | Fujii | |
| 2011/0165393 A1 | 7/2011 | Bayne et al. | |
| 2012/0052302 A1* | 3/2012 | Matusick ................ C03C 15/00 428/410 | |
| 2012/0069509 A1 | 3/2012 | Ikeguchi | |
| 2012/0196071 A1 | 8/2012 | Cornejo et al. | |
| 2013/0109116 A1 | 5/2013 | Cavuoti et al. ................. 438/27 | |
| 2013/0183454 A1 | 7/2013 | Nguyen et al. ............... 427/508 | |
| 2014/0176853 A1* | 6/2014 | Wang ................ G02F 1/133308 349/58 | |
| 2015/0008819 A1* | 1/2015 | Yu ......................... H01L 51/524 313/504 | |

FOREIGN PATENT DOCUMENTS

| | | |
|---|---|---|
| JP | 20080009356 A | 1/2008 |
| JP | 2008033051 A | 2/2008 |
| JP | 2008056544 A | 3/2008 |
| JP | 2008066706 A | 3/2008 |
| JP | 2008145621 A | 6/2008 |
| JP | 2009073711 A | 4/2009 |
| JP | 2011166923 A | 8/2011 |
| KR | 868228 B1 | 11/2008 |
| KR | 979691 B1 | 9/2010 |
| WO | 2004108617 A2 | 12/2004 |
| WO | 2009157378 A1 | 12/2009 |
| WO | 2010099304 A2 | 9/2010 |
| WO | WO2010/135614 A1 | 11/2010 |
| WO | 2011006031 A2 | 1/2011 |
| WO | 2015013360 A1 | 1/2015 |

OTHER PUBLICATIONS

Takechi et al. "High-Rate Glass Etching Process for Transferring Polycrystalline Silicon Thin-Film Transistors to Flexible Substrates"; IEEE Transactions on Semiconductor Manufacturing, vol. 18, No. 3 (Aug. 2005); pp. 384-389.

Kitaigorodskii et al.; "Strengthening Sheet Glass by Etching"; Glass and Ceramics, 20, 1963; pp. 183-187.

Krasovskaya et al.; "The influence of the composition of thy hydrofluoric acid bath on the strengthening of silicate glasses"; Glass and Ceramics, 20, 1963; pp. 193-194.

Kurkjian et al.; "Effects of heat treatment and HF etching on the strength of silica lightguides"; Proc. SPIE 5465, 2004; pp. 223-229.

Okhrimenko et al.; "Influence of strengthening by deep etching in hydrofluoric acid on the strength in axial tension of technical glass"; Strength of Materials, 14, 1982; pp. 254-258.

\* cited by examiner

METHOD OF STRENGTHENING AN EDGE OF A GLASS SUBSTRATE

This application claims the benefit of priority under 35 U.S.C. §119(e) of U.S. Provisional Application Ser. No. 61/925,832 filed on Jan. 10, 2014 and U.S. Provisional Application Ser. No. 61/973,504 filed on Apr. 1, 2014, and U.S. Provisional Application Ser. No. 62/030,116 filed on Jul. 29, 2014, the content of which are included herein by reference in their entirety.

BACKGROUND

1. Field

The present invention relates generally to methods of strengthening a glass substrate, and more particularly to methods of strengthening an edge of a display panel.

2. Technical Background

Both current and future display devices that are exposed to everyday handling abuses, particularly hand held devices such as cellular phones and tablet computing devices, must be resistant to damage. At the same time, manufacturers are increasingly designing thinner devices, reducing bulk both by reducing the supporting shell enclosing the device, and by producing thinner display panels by reducing the thickness of the glass substrates comprising the panels. As a result, the display device itself becomes more flexible. In some applications the display panel may be intentionally and permanently bent during manufacture into predetermined, non-planar shapes. Accordingly, display manufacturers are becoming ever more concerned about both the surface and edge strength of the display panels and the potential for failure that can originate from both surface and edge flaws when the panel is exposed to applied stresses.

SUMMARY

To reduce the incidence of glass failure from edge-related flaws in particular, a set of processes are disclosed that, when bundled together, provide strength and damage resistance to liquid crystal displays (LCD) or organic light emitting diode (OLED) displays edges and/or surfaces. These processes include surface and edge strengthening through chemical etching, grinding and polishing to control the location of impact should and impact occur and to minimize chipping and damage, and coating of edges to minimize edge damage that can weaken the glass. Such coatings may be temporary and designed to protect surface electronics during the above processes, and to protect the glass during and/or after these processes so as to preserve the strength that has been attained.

In one embodiment a method of strengthening the edge of a glass substrate is disclosed comprising masking a display panel, the display panel comprising a first glass substrate and a second glass substrate spaced apart from the first glass substrate and sealed to the first glass substrate with a sealing material, the first glass substrate comprising a terminal portion extending beyond the second glass substrate and electrically conducting terminal members disposed on the terminal portion, the masking comprising depositing a terminal masking material over the electrically conducting terminal members on the terminal portion and exposing edge surfaces of the display panel to an acid solution for a time and at a temperature effective to remove no more than about 20 micrometers of glass from the edge surfaces. The acid solution may comprise HF in a molar concentration in a range from about 1.5 M to about 6 M and may further comprise HCl in a molar concentration in a range from about 1 M to about 6 M. The acid solution may comprise HF in a molar concentration in a range from about 1.5 M to about 6 M and further comprise $HNO_3$ in a molar concentration in a range from about 1 M to about 6 M. The acid solution may comprise HF in a molar concentration in a range from about 1.5 M to about 6 M and further comprise $H_2SO_4$ in a molar concentration in a range from about 1 M to about 6 M.

In some embodiments the acid solution can comprise HF in a molar concentration in a range from about 3.5 to about 4.5 and HCl in a molar concentration in a range from about 3.5 M to about 4.5 M.

The acid solution can be at a temperature in a range from about 19° C. to about 24° C.

The display panel comprises as-cut edge surfaces, or the edge surfaces may be processed after cutting, such as by being ground or polished.

The terminal masking material preferably fills a gap between the first and second glass substrates adjacent the terminal portion after the depositing.

In some embodiments the terminal masking material can be deposited as a plurality of discrete line segments by a suitable deposition apparatus, such as a dispensing robot.

If the outwardly facing major surfaces of the display panel comprise additional layers of material on the glass substrates, such as ITO or polarization layers, a surface masking film can be deposited on the outwardly facing major surfaces.

The surface masking film is preferably recessed from edges of the exposed major surfaces a predetermined distance, for example in a range from about 0.1 mm to about 0.5 mm.

Masking of the display panel may further comprise depositing an edge masking material in a gap between the first glass substrate and the second glass substrate along non-terminal portion sides of the display panel, for example by contacting the edge surfaces of the display panel with a porous and resilient applicator pad to which an edge masking material has been applied. In some embodiments the porous, resilient applicator pad can comprise a roller.

Depositing the edge masking material can comprise inserting an edge surface of the first glass substrate and an edge surface of the second glass substrate opposite the edge surface of the first glass substrate in an elongate channel containing the edge masking material such that the edge surface of the first glass substrate and the edge surface of the second glass substrate contact the edge masking material, and the edge masking material wicks into the gap between the first glass substrate and the second glass substrate.

Additional features and advantages of embodiment described in the present disclosure will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description present embodiments of the present disclosure, and are intended to provide an overview or framework for understanding the nature and character of the embodiments as they are claimed. The accompanying drawings are included to provide a further understanding of the embodiments, and are incorporated into and constitute a part of this specification. The drawings illustrate various embodiments of the disclosure, and together with the description serve to explain the principles and operations of the embodiments.

DETAILED DESCRIPTION

Reference will now be made in detail to embodiments of the present disclosure, examples of which are illustrated in the accompanying drawings. Whenever possible, the same reference numerals will be used throughout the drawings to refer to the same or like parts.

Device manufacturers are requesting display panels that are thin and strong in order to facilitate thinner devices and in some instances display panels that can be intentionally and permanently bent into predetermined shapes. For example, display panels as thin as 0.1 mm are now commercially available. Such display panels can be found, for example, in recently available curved cellular telephones and in wearable electronics (e.g. wrist worn devices). As used herein, a display panel may be a liquid crystal display panel that incorporates at least a color filter substrate and a TFT array substrate, both comprised of glass and joined by a sealing material disposed between the two substrates. However, it should be understood that the methods described herein may be employed with other display panels, such as plasma display panels, phosphor display panels or more broadly, any glass package comprising two glass substrates joined together by a sealing material.

One way to achieve thinner display panels is by reducing or eliminating the air gap between the display panel and a protective cover substrate (cover glass) typically placed in front of the display panel. The cover glass provides protection from mechanical damage to the display panel itself. In some instances the cover glass contacts the display panel. In other cases the cover glass is bonded to the display panel. In some instances, particularly when the cover glass is bonded to the display panel, the display panel becomes the strength member of the overall device and stress applied to the cover substrate can be conveyed directly to the display panel. Moreover, some device designs arrange the display in an edge-to-edge configuration to eliminate the bezel usually found on such devices. By edge-to-edge what is meant is that the display panel extends from one side of the device to the other side of the device, thereby exposing edges of the display panel to contact-induced damage during in-service use rather than the panel edges being protected by the case and/or bezel of the device.

Newly-formed glass is exceptionally strong. However, when a brittle material, such as glass, for example a glass substrate used in the manufacture of a display panel, is exposed to downstream manufacturing, finishing and handling activities, this initial pristine strength can be degraded by flaws produced on a surface of the glass. A brittle material does not experience large-scale plastic flow when a stress is applied, and can be severely weakened by sharp flaws in a surface thereof. Moreover, tensile stress applied close to the tip of a flaw is substantially greater than the average stress over the entire geometry of the flaw. An applied tensile stress can break atomic bonds at the flaw tip and produce a crack. The applied tensile stress may cause the crack to propagate across the brittle material, forming new surfaces perpendicular to the maximum value of the applied tensile stress.

Figure 1:
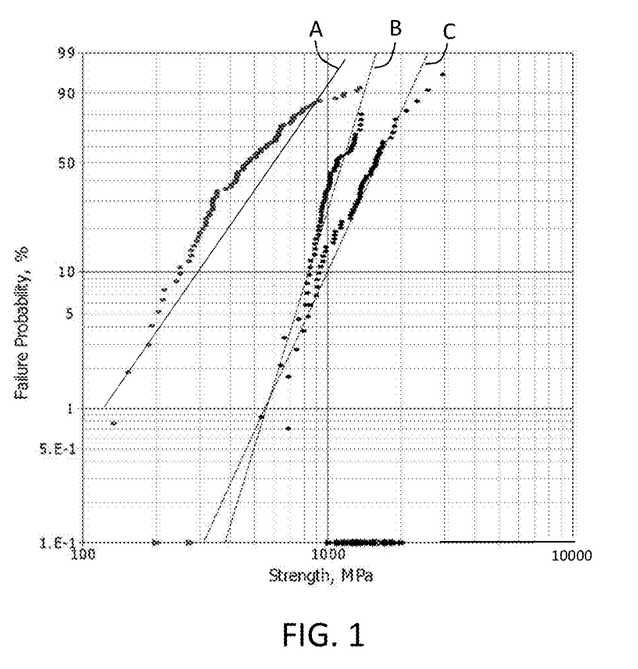
FIG. 1 is a graph showing the loss of strength of a glass substrate in going from an as-formed glass substrate to its incorporation into a display device.

Although the major surfaces of a glass substrate are not immune to the introduction of flaws, the exposed edges of the glass are particularly susceptible to damage. FIG. 1 illustrates a plot of cumulative failure probability as a function of flaw strength, more commonly referred to as a Weibull plot. Three sets of data are illustrated, represented by lines A, B and C. Each data set is generally angled from bottom left toward top right, each comprising a positive slope. Each data set represents the failure probability of a plurality of glass samples under an applied tensile stress. In reference to FIG. 1, for a brittle material under a relatively small amount of stress, the probability of material failure is very low. To cause material failure at a low tensile stress, for example 100 megaPascal (MPa), the failing flaw must be relatively large, and the probability that such a large flaw exists is low. As the applied tensile stress becomes larger, smaller, stronger flaws begin to cause failure of the material. Eventually, at very high applied tensile stress, for example in the 1000 to 2000 megaPascal regime in reference to the glass samples of FIG. 1, even very small flaws lead to failure and the resultant cumulative probability of failure is high. It should be noted that in this regard, glass strength is determined by the "weakest" flaw. Accordingly, one desires that the flaws of the population are very small flaws, i.e. are very strong flaws.

The data sets represented by lines B and C represent substrates of as-drawn display-type glass, whereas the data set represented by line A represents display glass removed from manufactured display devices. The degradation in glass strength from the as-drawn condition to the device condition is clearly evident by the shift in the data to the left (line A).

Device manufacturers are concerned with increasing the edge and surface strength of display panels by reducing the population of low strength flaws thereon, and more particularly, by modifying the geometry of flaws, such as by modifying the flaw tip geometry to eliminate sharp flaw tips. For example, glass strengths in excess of 900 megaPascals may be required for shaped (e.g. curved) display panels for use in hand held electronic devices.

A relevant strength distribution on the product of interest and the flaw population of interest, e.g. surface or edge can be obtained by first observing the lowest measured strength value from the relevant strength distribution to estimate the largest flaw. By "relevant" what is meant is that the strength distribution is an appropriate representation of the flaw population of interest. In particular, one wants to obtain an estimate of the largest flaw that should be etched.

Because not all possible flaws have statistically been tested, one then chooses the lowest strength as being a reasonable fraction of the lowest measured strength. For example, if the lowest measured strength is 100 MPa from the relevant strength distribution, one might choose the lowest strength (largest flaw) to be 50% to 70% of that value.

The largest flaw, then, is created artificially through the use of well-established diamond indentation methods where sharp cracks are created. Strength testing is used to match the strength of the indent to the desired strength of the estimated largest flaw. An appropriate etchant recipe and etch time is then developed though an iterative process.

A 4-point bend test (ASTM C158) can be used to evaluate glass strength by simulating stress generated from localized surface contact events. The 4-point bend is a good test for flaws imparted during manufacturing and handling.

Maximum stress is applied in a region between two loading points—a loading span and a support span. This test effectively tests the two bottom edges of the sample. Other tests, such as ASTM C1499 ("ring-on-ring"), may also be used to test other flaws, such as surface flaws.

The desired Depth of Removal (DoR) of the glass material should be estimated to be approximately equal to the depth of the largest flaw as estimated from the lowest strength using the following equation $$a = \frac{1}{\pi}\left(\frac{K_{IC}}{0.73\sigma_f}\right)^2 \quad (1)$$

where $\alpha$ is the flaw depth, $\sigma_f$ is the strength and $K_{IC}$ is the fracture toughness of the glass.

For a given etchant chemistry, the glass sample may be etched to the estimated DoR. This will require knowledge of the etch rate for a given chemistry and etchant temperature. The strength after etching can be measured and compared to the original strength distribution of the artificial flaws. If the strength of all the artificial flaws increases by about one order of magnitude, the etch process may be deemed acceptable for the intended flaw population. If the flaw population has not shifted sufficiently the etchant chemistry and etch time can be modified until the desired effect on the artificial strength distribution is achieved.

Once the desired strength shift is established, it may still be desirable to optimize the etchant chemistry to reduce sludge, reduce etching time, address etching safety issues, and further optimize etching for the desired glass strength. Alternatively, for a variety of reasons one may desire to strengthen only a fraction of the flaws of concern. For example, in the case where failure is determined to originate from a particular location of the glass part one may want to focus only on flaws in that region and not strengthen flaws located elsewhere. Consequently, the processes described herein may be used to strengthen not all possible flaws, but only flaws above a determined strength level or in a particular location. In this case the foregoing summarized procedure may be used with the exception that it is not designed for the largest flaw but rather a smaller flaw depth.

Taking note of the foregoing disclosure, processes are described in more detail below that can provide strength and damage resistance to the edges of a display panel. In some embodiments, surfaces of the display panel and/or cover glass are strengthened through chemical etching. Edges of the display panel may be similarly strengthened. The edges may be as-cut, or ground and polished to control the location of impact should such impact occur, and to minimize damage (e.g. chipping) at the edge. The edge surfaces of the display panel can then be coated after etching to minimize the introduction of post-processing damage that can weaken the glass. Certain coatings can be used as temporary coatings configured to protect surface electronics during the above processes and then removed.

Embodiments of the present disclosure can provide improved reliability in situations where pre-existing edge flaws experience Hertzian contact stresses during blunt impact. During such an occurrence, pre-existing edge flaws can experience stress due to local flexure. Embodiments described herein can provide a significant strength increase that can affect the entire edge and which strength increase is not dependent on the glass shape and can therefore work for shaped glass. Methods disclosed herein can also preserve precise device dimensions. Since these methods remove minimal substrate material, the involved etching processes can be performed such that they do not alter the overall substrate dimensions after precision cutting or shaping. To wit, the length, width and thickness of the display (glass substrates) may not be significantly altered.

U.S. Patent Publication No. 20130109116 filed on Jul. 3, 2012 describes a method by which the surfaces of large mother display panels can be strengthened by chemical etching. The display mother panels are glass envelopes formed by sealing together several sheets of glass, the sealed assembly representing a plurality of yet-to-be individual display panels. The mother panel may later be cut into individual display panels destined to be incorporated into separate display devices. Surface etching of the mother panel, however, does not address flaws that may be formed along newly-formed edges of the subsequent discrete display panels that are later cut from the mother panel. To obtain strengthened and protected edges of a glass substrate, and in particular one or more glass substrates comprising an assembled individual display panel, one may begin with a display panel that has been separated into individual device-size panels. The edges, therefore, are those that will be installed in the final device, and may be weak due to flaws created during the separation process, for example the common score and break process or even by an edge finishing process such as grinding.

Figure 2:
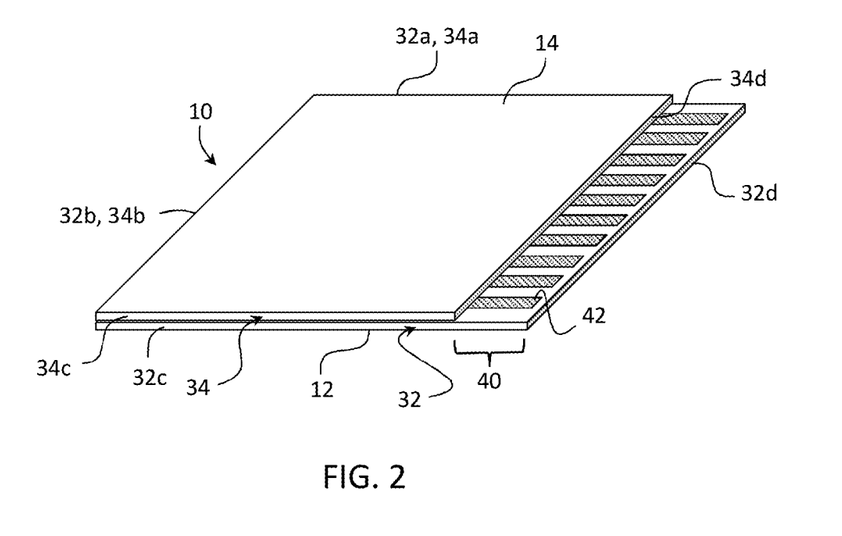
FIG. 2 is a perspective view of an example display panel.
Figure 3:
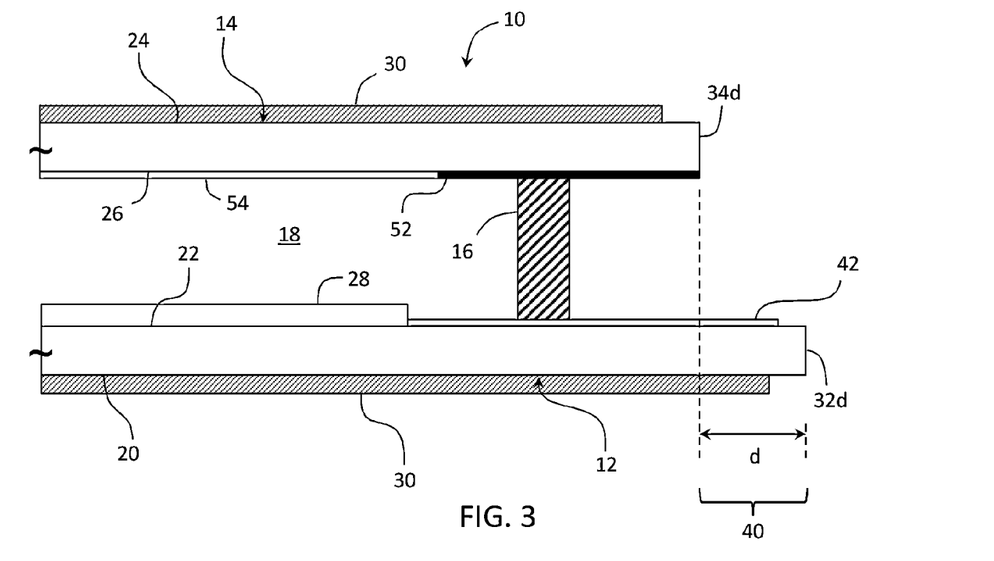
FIG. 3 is an side cross sectional view of the display panel of FIG. 2.

FIGS. 2 and 3 illustrate respectively a perspective view and a side view of an example display panel 10 comprising at least a first glass substrate 12 and a second glass substrate 14 spaced apart from first glass substrate 12 and joined thereto with a sealing material 16. Sealing material 16 is generally positioned near a periphery of both first and second glass substrates inward of the perimeter edges of the glass substrates and bonds first glass substrate 12 to second glass substrate 14 via their respective major surfaces. Sealing material 16 is typically in the shape of a closed loop that, in combination with the first and second substrates, encapsulates a space 18 interior thereto. The display panel may or may not include a liquid crystal material within interior space 18 encapsulated between the glass substrates and the seal. First glass substrate 12 includes an outwardly facing first major surface 20 and an inwardly facing second major surface 22. First major surface 20 of first glass substrate 12 may be planar as shown and is generally parallel with second major surface 22. Outwardly facing first major surface 24 of second glass substrate 14 may be planar as shown and is generally parallel with an inwardly facing second major surface 26 of second glass substrate 14 that is opposite first major surface 24. Second major surface 22 of first glass substrate 12 may include an electrically functional layer 28 deposited thereon, which may include one or more layers of silicon, metal and/or metal oxides. For example, electrically functional layer 28 may comprise at least a portion of one or more thin film transistors (TFTs). Either one or both of first major surfaces 20 and 24 may include one or more additional layers of material 30, such as a metal oxide layer, for example a layer of indium tin oxide (ITO).

Figure 4:
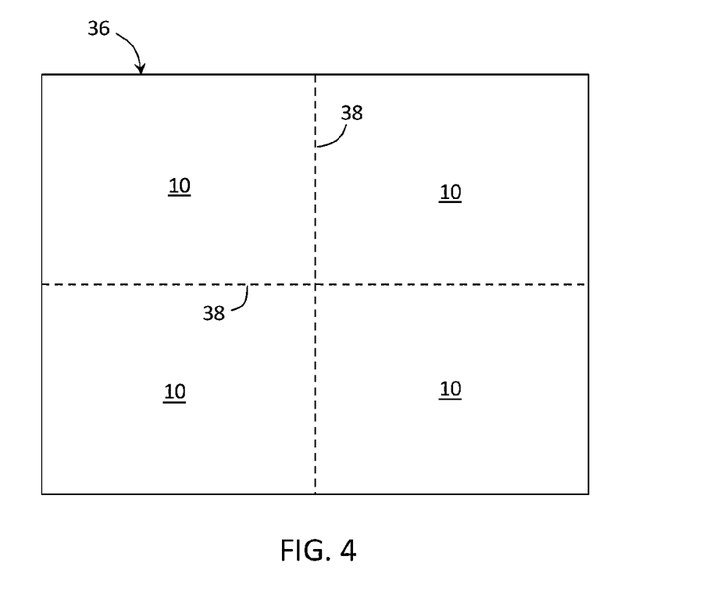
FIG. 4 is a top view of how a mother display panel may be cut into a plurality of individual display panels.

Each glass substrate 12, 14 further comprises a respective peripheral edge surface 32, 34 formed during a separation (e.g. cutting) process from a mother display panel 36, as shown in FIG. 4. For example, FIG. 4 illustrates an example where four individual display panels 10 may be cut from mother panel 36 along cut lines 38. Returning to FIG. 2, for the purpose of explanation and not limitation, display panel 10 is assumed to be a rectangle such that the peripheral edge surface 32 of first glass substrate 12 and peripheral edge surface 34 of second glass substrate 14 each comprise four sections. Other display panel shapes, with more or fewer edge surface sections may be used. Again, for the sake of explanation and not limitation, the edge surface sections of edge surface 32 are represented by reference numerals 32*a*, 32*b*, 32*c* and 32*d*. Similarly, the edge surface sections of edge surface 34 are represented by reference numerals 34*a*, 34*b*, 34*c* and 34*d*. As shown, and to simplify discussion, respective edge surface sections are aligned generally such that edge sections 32*a* and 34*a* are on the same side of display panel 10, and so on for the remaining respective edge surface sections. In some embodiments, the individual edge surfaces may be substantially planar and perpendicular to the adjoining major surfaces of the respective glass substrate. In other embodiments the edge surfaces may be further processed after cutting, such as by grinding and/or polishing, and may be shaped. For example, the edge surfaces may comprise a curved or beveled portion.

As shown in FIGS. 2 and 3, first glass substrate 12 may comprise a terminal portion 40 terminating at edge surface 32*d* that extends outward beyond second glass substrate 14. Terminal portion 40 forms an electrical connection area where components of the display device external to the display panel 10 can make electrical connection to the interior space 18. Accordingly, terminal portion 40 may include a plurality of electrical terminal elements 42 positioned thereon that extend from terminal portion 40 into interior space 18 through or beneath sealing material 16. For example, the plurality of electrical terminal elements 42 may be electrically connected with the one or more thin film transistors that may reside within interior space 18. In some examples a display panel may comprise more than one terminal portion 40.

Figure 5:
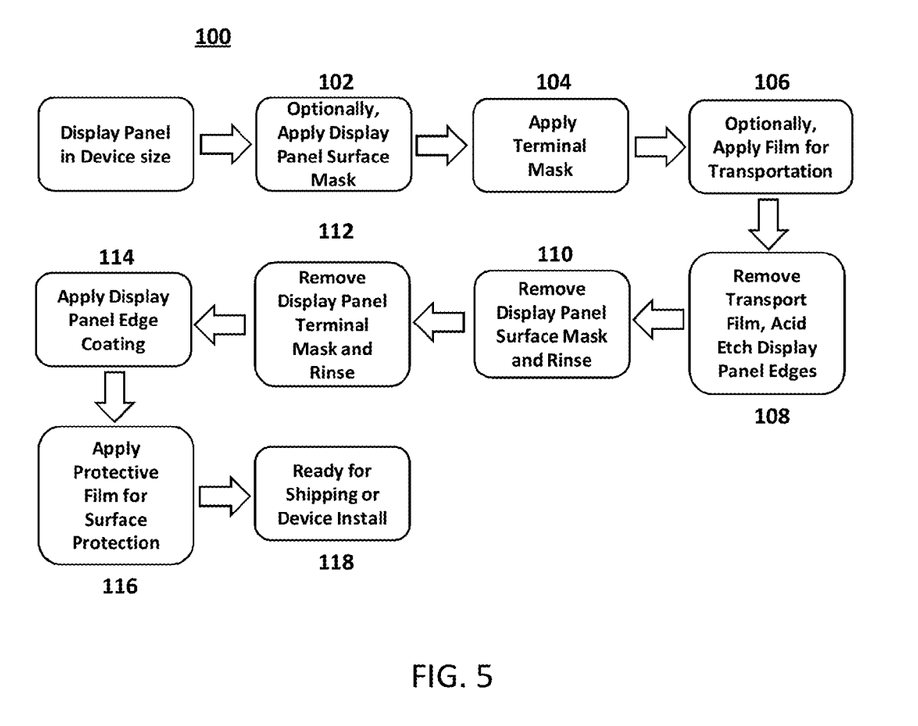
FIG. 5 is a process flow chart of a method of strengthening a surface and/or edge of a glass substrate comprising a display panel.

In accordance with the present disclosure, a flow diagram shown in FIG. 5 illustrates an example process 100 for obtaining and/or maintaining strengthened edges of a glass substrate, and more particularly a display panel comprising multiple glass substrates, such as an LCD display panel.

Prior to performing the etching process, the panel may be cleaned in a cleaning solution. For example, a 1% aqueous bath of SemiClean KG may be used at a temperature of approximately 50° C., for example in a range from about 40° C. to about 60° C. The panel to be etched is dipped into the cleaning solution bath for a time in a range from about 4 minutes to about 6 minutes, for example about 5 minutes. Following the cleaning solution exposure, the panel can be rinsed, for example by dipping the panel in warm deionized water for a time sufficient to remove the cleaning solution. In some examples the rinse step can be performed multiple times if needed, and in different rinse baths. After the rinse bath, the panel can be removed and spray rinsed with deionized water. A gentle flow of nitrogen and/or air can be used to eliminate dripping water, and the panel can be allowed to air dry.

Figure 6:
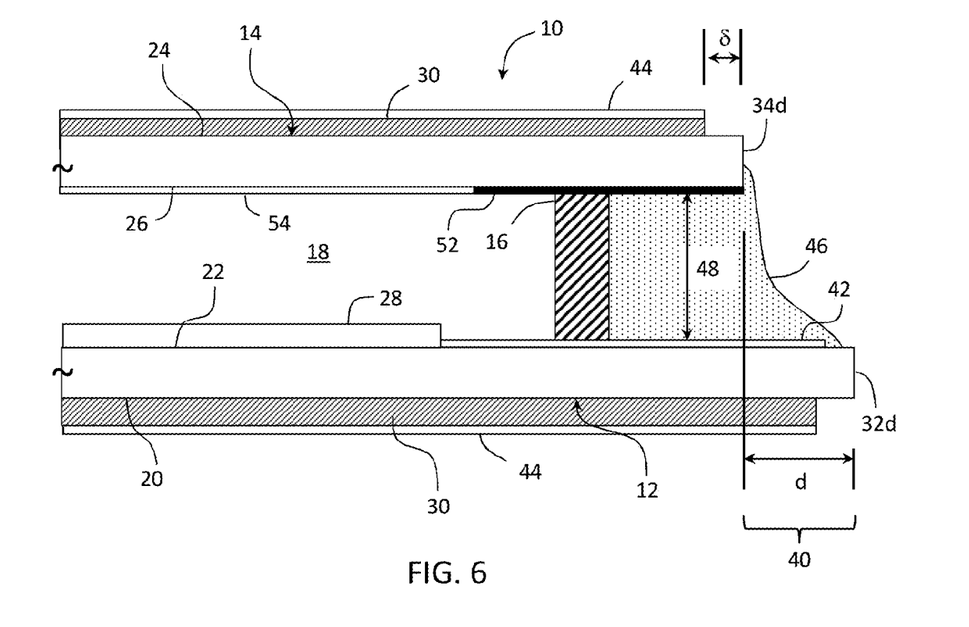
FIG. 6 is a side cross sectional view of an example display panel according to an embodiment of the present disclosure wherein a masking material has been applied to a terminal portion of the display panel.

In a first optional step 102, if one or both of the exposed major surfaces 20, 24 of display panel 10 have an additional layer of material, such as a deposited ITO layer, the additional layer of material may need to be protected during one or more subsequent etching processes. Thus, in one example an acid resistant film, hereinafter referred to as surface mask 44, can be applied to one or both of the display panel outwardly facing major surfaces, or to the additional layer of material 30 (e.g. ITO) as best seen in FIG. 6. For example, surface mask 44 may be a polymer film, for example a polyester film, and surface mask 44 may further comprise a pressure sensitive adhesive and optionally a release liner. In one example a suitable surface mask comprises Nitto Denko Lensguard 7568 adhesive tape.

Because surface mask 44 should be applied in a precise location, recessed from the panel edges, a substrate-to-substrate laminator may be used in the application process. For example, a suitable substrate laminator is a Suntec MPF65S-TS. Numerically controlled guides may be used to determine the placement of the surface mask on the glass. Surface mask 44 may be precut to the appropriate size if needed, and sized so that edges of the surface mask are inset a predetermined distance from the edges of the glass substrate to which the surface mask is applied, such as being inset a distance $\delta$ from about 0.05 millimeters (mm) to about 0.5 millimeters, for example, from about 0.1 millimeters to about 0.3 millimeters. Upon completion of subsequent etching steps, the one or more surface masks 44 may be removed.

Next, at step 104, the one or more terminal portions 40, and particularly the electrical terminal elements 42, may also be masked for a subsequent etching process. In one embodiment, an acid resistant polymer, hereinafter referred to as terminal mask 46, can be applied to the terminal portion and in particular to the terminal elements 42. Care should be used to ensure the terminal elements are well covered, while edge sections 32*d* and 34*d* should have a minimal amount of their surfaces covered by the terminal mask. For example, each edge section 32*d* and 34*d* should have less than about 50% of their edge surfaces covered by terminal mask 46, such as less than 25% or less than 10%. The less of the edge surfaces covered by the terminal mask, the more edge surface that can be exposed to the etchant during the acid etching process. Ideally, the terminal mask protects all of the electrical terminal elements, does not extend over edge surfaces of first glass substrate 12, and does not extend over edge surfaces of second glass substrate 14, although it is understood that some degree of edge surface covering may be difficult to avoid.

Terminal mask 46 may be deposited on terminal portion 40 as a liquid, which liquid wicks into edge gap 48 between the substrates via capillary action. Edge gap 48 may be as little as 5 micrometers (μm) in thickness, for example in a range from about 5 micrometers to about 15 micrometers. Prior to application of terminal mask 46, terminal portion 40 may be cleaned of organic contaminants with a suitable solvent to achieve appropriate wetting characteristics, for example by rinsing or wiping with acetone.

Figure 7:
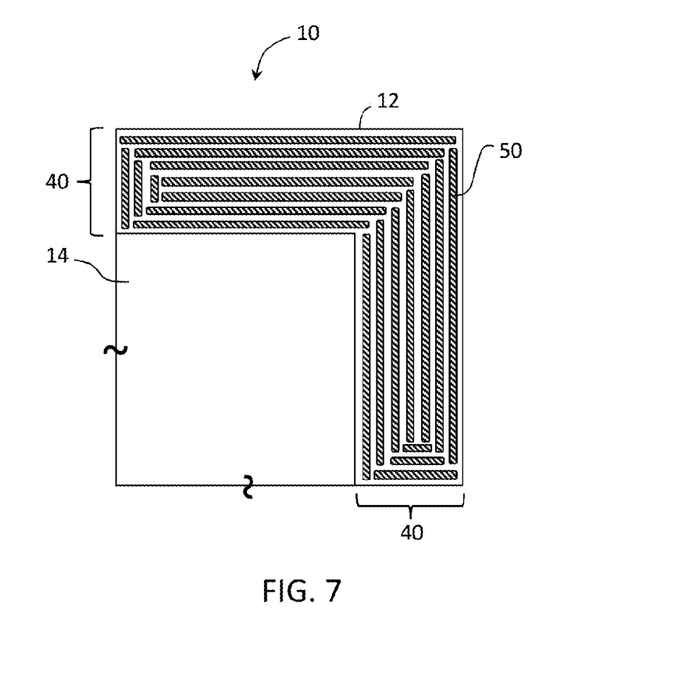
FIG. 7 is a top view of a portion of the display panel of FIG. 6 illustrating the deposition pattern for the masking material.

Terminal mask 46 may be applied, for example, via a needle dispense process, but other deposition processes or equipment may be used, such as but not limited to a piezo jet nozzle, a pneumatic jet nozzle, an aerosol jet nozzle or an inkjet print head. Dispensing of the terminal mask material may be performed by applying the mask material along a plurality of pre-determined discrete line segments. The dispense tool path pattern, volume and speed should be specified based on position over the terminal portion. FIG. 7 illustrates a portion of a display panel comprising two terminal portions 40, and a pattern comprising a plurality of discrete line segments 50 along which a terminal mask material is deposited onto the terminal portions. Such dispense patterns can be determined and programmed into the dispensing robot. The mask application pattern should be controlled such that adjacent lines of liquid are able to spread and coalesce into a continuous protective film (terminal mask 46) without flowing over edge surface 32d, and should also flow into edge gap 48 without flowing onto edge surface 34d. In some examples, terminal mask 46 can be deposited to be at least 0.05 millimeters from edge surface 32d. The terminal mask material should have a viscosity when deposited that is suitable for filling edge gap 48 via capillary action. For example, a photoresist material from the Microposit™ SC 1800 Series is a suitable material for producing terminal mask 46. The Microposit™ SC 1800 Series of positive photoresists are acid-etch resistant photoresists, available in various viscosities appropriate for masking. For example, SC-1827 (with a viscosity of 81 centipoise) is compatible with a needle dispense process. Microposit 1800 Series photoresists are shipped in one (1) liter bottles; they arrive pre-filtered and require no special preparation prior to loading in a syringe on a dispenser. However, other photoresist materials may also be suitable. A syringe barrel can be mounted on a dispensing robot and filled to 50%-80% capacity with resist material. On a laboratory scale, an Asymtek Dispensemate 555 robot was employed. The syringe barrel can have a volume capacity in a range from about 10 cubic centimeters to about 30 cubic centimeters. The syringe barrel should be formed from a UV blocking material (e.g. transparent orange or opaque black). Other equipment could be used for industrial scale operation.

Once the terminal mask material has been applied, solvents from the liquid terminal mask material should be removed and the terminal mask material dried to form terminal mask 46. For example, in one suitable process, the display panel can be placed on a substrate of cleanroom paper, and the display panel positioned on a hotplate at approximately 60° C. for about 5 minutes, with the cleanroom paper contacting the hotplate. Then, the display and cleanroom paper can be placed in an oven for drying. For example, one exemplary drying process can be performed as follows: The oven temperature is raised to 35° C. and the display panel inserted into the oven and held at 35° C. for 30 minutes, then the temperature is set to 50° C. After an additional 30 minutes the temperature is set to 65° C. After an additional 30 minutes the temperature is set to 75° C. After an additional 30 minutes the display panel can be allowed to cool and is removed from the oven. For mask materials comprising solvents, particularly UV-curable materials which also comprise volatile solvents, such materials should not be UV-cured. It has been found that during the drying process, even very long drying processes, all of the solvent may not be removed. The heat generated during the UV curing may then cause the volatile solvent to form bubbles, craters or other defects in the mask material that could allow the etching acid to reach the terminal elements. It should be understood that the foregoing process is based on a laboratory scale and an industrial-scale process can be implemented that includes the major components of the foregoing process, including the different heating and drying steps.

Skinning over, bubbles or craters can form in the terminal mask material during the drying process if the terminal mask material is dried too quickly, if the concentration gradient is too large, or if the diffusivity of the solvent is too low. Bubbles or craters can also form when the boiling liquid trapped inside escapes quickly. Bubbles and craters can occur near edge surface 34d, where the terminal mask material is thickest and the edge gap traps residual solvents. Thick coatings and long diffusion paths are particularly susceptible to skinning over and bubble formation. If encountered, this defect may be mitigated by using an alternate terminal mask material, such as a 100% UV curable material containing no solvents, by forming a thinner coating, or by using a drying cycle employing longer drying times. The use of a solvent-free UV-curable mask material has the advantage of eliminating the drying step and reducing the cure time to only 2-3 minutes. Suitable alternative materials can include Sun Chemicals XV1000 UV Etch Resist, General Chemical Coscoat 4300/4560 or the like. Once dispensed, terminal mask 46 coverage on the terminal portion can be inspected with a microscope or gauging system. A display panel with terminal mask defects (e.g. de-wetting, bubbles, voids, or coating skips) can either be cleaned off completely, or touched up manually with a fine brush viewed under a microscope.

De-wetting in particular can occur at the edge gap. It is believed that surface energy in this region is different due, for example, to residual surface material remaining from an upstream cleaning operation or other process operation. Different materials on the terminal portion can have different surface energies, resulting in different contact angles and wetting. De-wetting can also occur in the continuous flat areas on bare glass or on display panels where the terminal mask material selectively thins out, leaving an area of low coverage. Wide deposition lines 50 are more prone to these non-uniformities. De-wetting defects can further be found along interface lines between two different materials, such as between the electrical connection elements and bare glass. Accordingly, additional surface cleaning processes, such as using an atmospheric plasma, can be used prior to deposition of terminal mask 46.

At optional step 106, a film to provide mechanical protection during transportation and storage prior to the etching process, such as a polyethylene film or other polymer material, can be applied to the display panel outward facing surfaces and removed prior to step 108.

It has been found that immersion of display panel 10 such that all edge surface sections of the display panel are immersed during the subsequent acid etching step can be detrimental to black matrix material 52 comprising color filter 54 located on second glass substrate 14. Black matrix material 52 is deposited on the second glass substrate to block light within inter-pixel areas of the second glass substrate color filter 54 and/or to prevent ambient light from reaching the thin film transistors. The black matrix material can improve contrast ratio in high ambient lighting conditions. The black matrix material may comprise, for example, chromium. A chromium oxide adhesion layer may be deposited between a chromium metal layer and second glass substrate 14. In some embodiments black matrix material 52 may be a polymer material.

It has been found that the etchant used in the etching process can affect exposed black matrix material 52 within edge gap 48 between the first and second glass substrates, and in some instances form a multi-color (rainbow) effect. For typical display devices comprising surrounding bezels, this detrimental effect would go un-noticed, since the edge gap would be hidden behind the surrounding bezel. However, in those instances where the display panel is a so-called edge-to-edge display panel, where the display panel extends from one edge of the display device to another edge of the display device, and the display panel edge surfaces are exposed, such a color effect would be visually undesirable. Accordingly, in another embodiment, the edge gap between the sealing material and the edge surface portions of the first and second glass substrate 12, 14 is filled with an edge mask prior to the etching, while at the same time substantially preventing the edge mask from coating the edge surfaces 32a through 32c and 34a through 34c such that the etching is effective to modify any flaws on the edge surfaces.

The edge gap filling process can comprise the following steps: introducing an acid resistant ink (hereinafter edge mask material) into edge gap 48, removing any excess edge mask material from the display panel edge surfaces to insure the edge surfaces are exposed for acid etching, then curing the edge mask material to make it sufficiently robust to survive the acid etching process. As with the terminal mask material, the edge mask material should have a viscosity such that the edge mask material can flow into edge gap 48 along each edge of the display panel to which it is applied.

Several methods can be used to introduce an edge mask material (e.g. a UV curable carbon black ink such as Swiss Q) into the edge gap of the assembled display panel. For example, a dipping process can be used wherein the edge surfaces of the display panel are dipped into a suitable edge mask material, a dispensing pen similar to a felt-tip marker, a needle dispensing positive displacement piston or a focused spray into the edge gap.

Figure 8A:
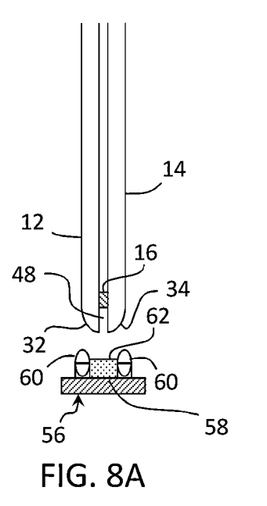
FIGS. 8A-8D illustrate a sequence of steps for the deposition of a masking material along non-terminal portion edges of the display panel.
Figure 8B:
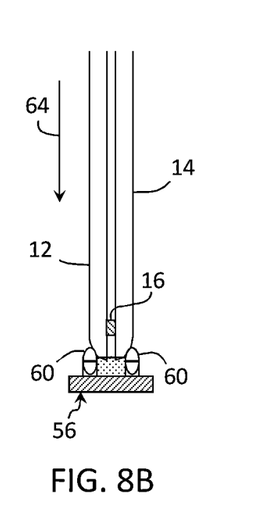
Figure 8C:
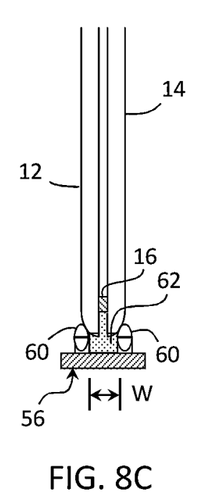
Figure 8D:
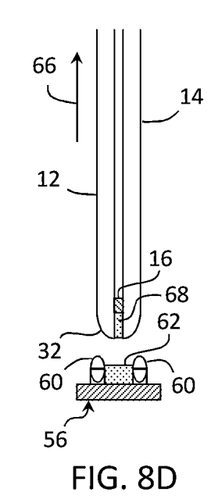
Figure 9:
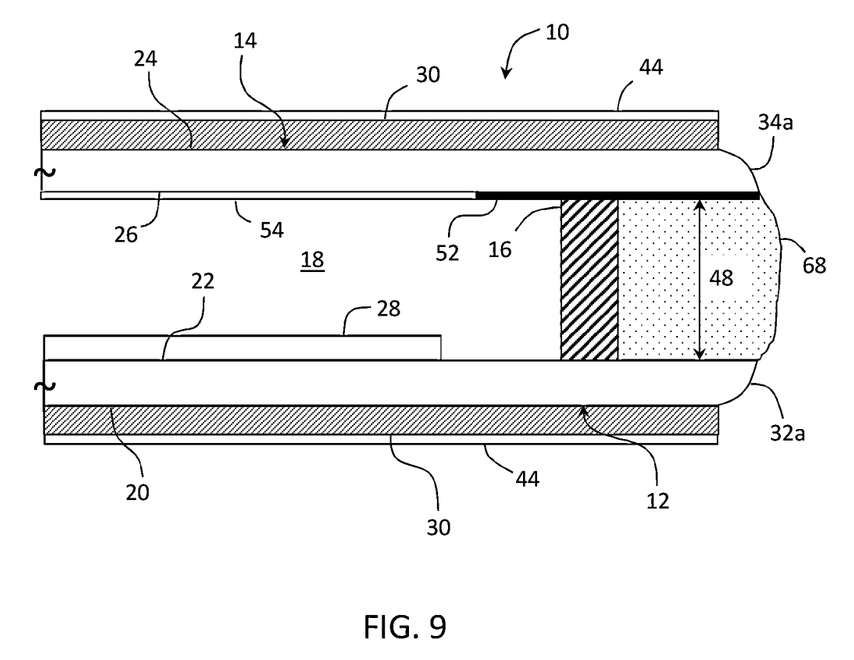
FIG. 9 is a side cross sectional view of the display panel of FIGS. 8A-8D showing the edge masking material positioned within a capillary gap of the display panel.

As shown in FIGS. 8A through 8D, in some embodiments a channel member 56 may be used for filling edge gap 48 of the non-terminal portion edge portions of display panel 10, i.e. the gap between edge surface pairs 32a-34a, 32b-34b and 32c-34c. FIGS. 8A through 8D includes a cross sectional view of channel member 56 comprising a channel 58 formed between two side walls 60 that serves as a reservoir for edge mask material 62. Display panel 10 is illustrated having processed edge surfaces 32 and 34 such that the edge surfaces are curved. A width W of channel 58 is sufficiently wide, and the reservoir of edge mask material is sufficiently high, that only the tips of the curved edge surfaces are able to immerse in the edge mask material, as best seen in FIG. 8B. The specific width W and the height of edge mask material 62 in channel 58 will depend on the specific thickness of the individual display panel. It is necessary only that edge mask material 62 contact both "tips" of the edge surfaces 32, 34 when lowered into the edge mask material, as shown in FIG. 8B and as indicated by arrow 64. The edge surface tips represent the outermost portion of the edge surface, that is to say the extreme perimeter of the substrate assembly. When the edge mask material 62 contacts both tips of the edge surfaces 32a and 34a, capillary action can cause the edge mask material to wick into the edge gap 48, shown in FIG. 8C. Once the wicking occurs, display panel 10 may be withdrawn from the edge mask material as shown in FIG. 8D and indicated by arrow 66. Excess edge mask material may be wiped from the edge surfaces (e.g. edge surfaces 32a, 34a) with a solvent-soaked cleanroom wipe or by rinsing with a solvent if desired, leaving the edge mask material only within edge gap 48, or with only a very little edge mask material covering the edge surfaces, as shown in FIG. 9. A rinsing process may be used to minimize any damage or the introduction of any contaminants from using the cleanroom wipes to mechanically wipe the edge surfaces. This process may be repeated along other sides of the panel.

The foregoing process may be repeated for the remaining edge surfaces on each non-terminal portion side of the display panel (e.g. edge surfaces 32b-34b, 32c-32c).

With the glass edge surfaces exposed and capillary pressure holding edge mask material 62 in place, the edge mask material may be cured after application by a method compatible with the particular material, thereby forming edge mask 68. For example, curing may comprise UV curing in a UV curing chamber (e.g. a ProCure™ 350 UV Chamber by 3D systems) that exposes the entire display panel to UV light and insures all of the display panel edge masks 68 are cured and sealed.

Figure 10A:
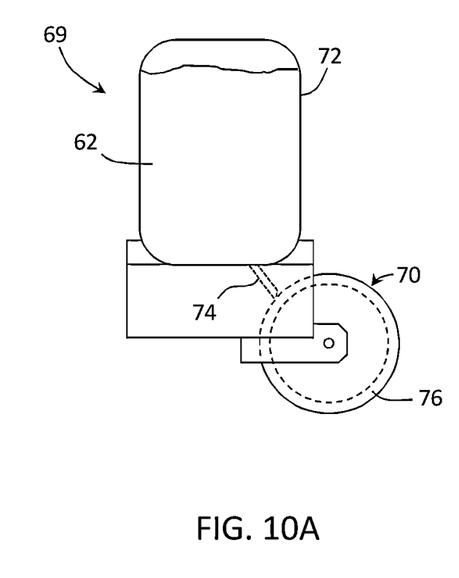
FIGS. 10A-10B show orthogonal schematic views of a pin stripping apparatus for applying an edge mask material into the edge gap of a display panel.
Figure 10B:
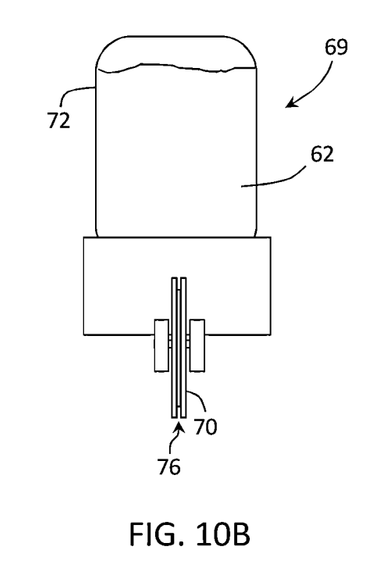
Figure 11A:
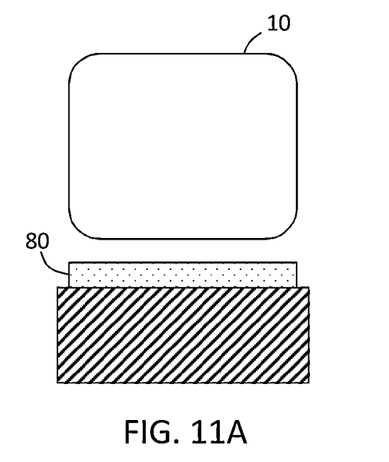
FIGS. 11A-11E illustrate a sequence of steps for another method of depositing a masking material within the capillary gap of non-terminal portion edges of a display panel.
Figure 11B:
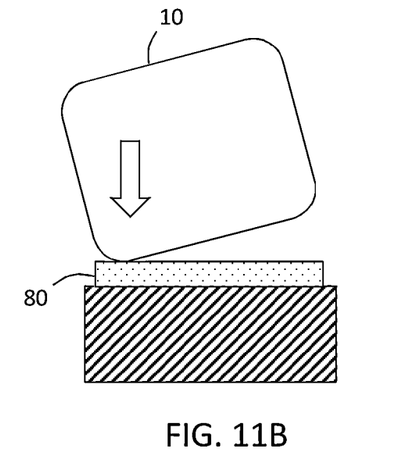
Figure 11C:
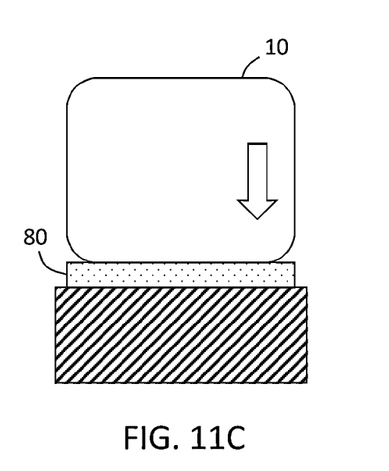
Figure 11D:
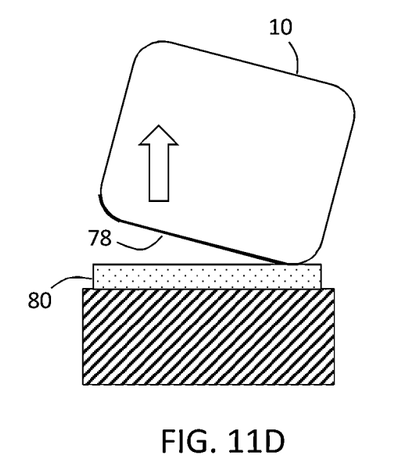
Figure 11E:
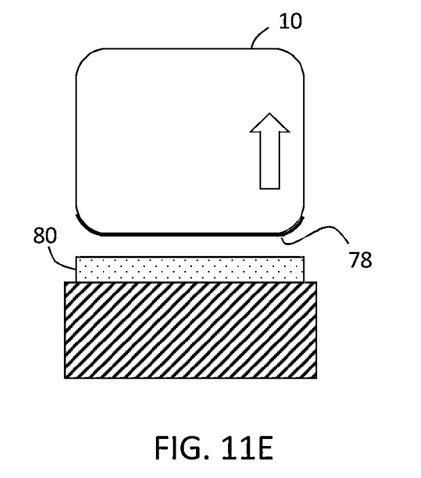

In an alternative application process, a pin striping apparatus 69 shown in the orthogonal schematic views of FIGS. 10A and 10B is provided with the edge mask material. The pin striping apparatus shown in FIGS. 10A and 10B comprises an applicator wheel 70 in fluid communication with the edge mask material 62, contained for example in a reservoir 72, via a passage 74. The edge mask material can be supplied, for example, to a channel 76 about a perimeter of applicator wheel 70. The applicator wheel 70 containing the edge mask material is run along edge gap 48 of the display panel to allow the edge mask material to wick into the edge gap and fill the edge gap with edge mask material. Once the gap is filled, excess edge mask material is gently removed to expose the glass edge surfaces of the panel. The edge gap can be permanently filled or temporarily filled, with the only requirement being that the ink survive the acid etching process. However, allowing the edge mask to permanently become part of the display panel eliminates a post-acid etch removal process step that might otherwise impart damage to the now etched glass edge.

There are at least several advantages to filling in the edge gap with acid resistant material including that applying an edge mask dramatically minimizes the "color hue" effect within the edge gap, excess edge mask material on the edge surfaces can seal the surface mask edge to the glass surface which creates little to no acid leakage under the surface mask film compared to panels with no edge mask.

As in the previous embodiment, with the glass edge surfaces exposed and capillary pressure holding edge mask material 62 in place, the edge mask material may be cured after application by a method compatible with the particular material, thereby forming edge mask 68. For example, curing may comprise UV curing in a UV curing chamber (e.g. a ProCure™ 350 UV Chamber by 3D systems) that exposes the entire display panel to UV light and insures all of the display panel edge masks 68 are cured and sealed.

At step 108, edges of the display panel are acid etched by exposing the display panel to an acid solution for a time and at a temperature effective to remove no more than about 20 micrometers of glass per immersed edge. The display panel may be gently washed prior to the etching process with a suitable detergent, for example by using a 1% to about 4% aqueous solution of Semi-Clean KG at a temperature in a range from about 65° C. to about 90° C., for example from about 65° C. to about 75° C., then immediately rinsed with warm (e.g. 50° C.-55° C.) deionized water. In some instances, particularly when surfaces of the first or second glass substrates 12, 14 may include an ITO or other deposited material, the detergent solution concentration may be kept to equal to or less than a 1% solution. The display panel can then be dried, for example by air drying.

An $HF-H_2SO_4$, $HF-HCl$ or $HF-HNO_3$ acid solution (etchant) may be used for etching. Exposure of the display panel edges can be performed by immersing the entire display panel into the acid solution so that all edge surface sections of each glass substrate of the display panel are immersed, or by selectively immersing only selected edge surfaces, for example by mounting the display panel in a suitable holder and dipping the edge surfaces singularly into the acid solution. A suitable acid solution may comprise HF and HCl in molar concentrations in a range from about 1.5 M (mol/L) to about 6 M and greater than 1 M (for example in a range from about 1 M to about 6 M, respectively ($1.5M \leq HF \leq 6$ M, $1M \leq HCL \leq 6$ M), at a temperature in a range from about 19° C. to about 24° C., for example in a concentration range from about 3.5 M to about 4.5 M HF ($3.5M \leq HF \leq 4.5$ M) and HCl in a range from about 3.5 M to about 4.5 M ($3.5M \leq HCl \leq 4.5$ M), or HF in a range from about 3.8 M to about 4.3 M ($3.8\ M \leq HF \leq 4.3$ M) and HCl in a range from about 3.8 M to about 4.3 M ($3.8\ M \leq HCl \leq 4.3$ M). In some examples a molar concentration of 4 M HF and 4 M HCl has been found to be a reasonable balance between duration of etch and etch rate, having an etch rate of approximately 1.8 micrometers/min. The etch rate should be at least 1 micrometer/minute. This is of particular interest owing to the placement of the terminal members and their possible exposure to the acid solution. To perform the etching, the display panel edge surfaces may be exposed for a time sufficient to remove no more than about 20 micrometers of glass from any particular exposed edge surface, for example in a range from greater than zero micrometers to equal to or less than 20 micrometers, in a range from about 1 micrometer to about 20 micrometers, in a range from about 5 micrometers to about 20 micrometers, or in a range from about 10 micrometers to about 20 micrometers. In other examples the display panel edge surfaces may be exposed for a time sufficient to remove about 18 to about 20 micrometer of glass, or in a range from about 14 micrometers to about 18 micrometers, or in a range from about 10 micrometers to about 16 micrometers. Some small amount of experimentation may be required to determine the optimal etching time based on the obtained material removal.

Alternatively, a solution comprising HF in a concentration equal to or greater than 1.5 M but equal to or less than 6 M ($1.5M \leq HF \leq 6$ M) and $HNO_3$ in a concentration greater than or equal to 1 M but equal to or less than 6 M ($1.5M \leq HNO_3 \leq 6$ M) may be used at the same temperature range, but with a difference in the quality of the glass edges after etching. For example, small portions of the terminal mask may be removed by the $HF-HNO_3$ acid solution. In some experiments, a small thin line of residual etching by-products was found around the edge of the surface mask. The thickness of this residue layer was found to be greater when etched with an $HF-HNO_3$ acid solution when compared with the residue associated with an HF—HCl etching treatment. Without wishing to be bound by theory, this is believed to indicate that the HF—HCl solution better dissolves the sludge generated near the edge during etching when compared to $HF-HNO_3$ acid solution. In still other embodiments a solution comprising HF in a concentration equal to or greater than 1.5 M but equal to or less than about 6 M ($1.5M \leq HF \leq 6$ M), and $H_2SO_4$ in a concentration equal to or greater than 1 M but equal to or less than 6 M ($1.5M \leq H_2SO_4 \leq 6$ M) may be used. However, it has also been found that the $HF-H_2SO_4$ acid solution may produce an undesirable quantity of sludge.

Returning to FIG. 5 at step 110, once the etching process has been completed, surface mask 44 can be removed. For example, the display panel may be soaked in warm (50° C. to about 55° C.) tap water or warm deionized (DI) water for a time in a range from about 4 minutes to about 10 minutes, or until the surface mask is released from the panel. However, such wet-release methods can sometimes cause surface mask 44 to be released by water seeping under the mask from one of the side edges. This seeping of water beneath the surface mask can result in large surface marking of the glass after removal of the mask.

To eliminate these surface markings, an alternative dry film peeling process can be used. The display panel can be securely held, such as by placing the display panel on a vacuum chuck. While the panel is held in place by the vacuum chuck, surface mask 44 is peeled away from the display panel surface, for example by using a small adhesive tape attached to a perimeter edge portion of the surface mask and pulling up and back on the adhesive tape.

The display panel should be completely dry before the dry peeling is performed. Any water near the edge of the surface mask may be dragged across the display panel surface during the peeling and mark the surface of the glass or any ITO layer thereon.

At step 112 terminal mask 46 (and edge masks 68, if present), is removed, for example by immersing terminal portion 40 (and/or edge surface sections), including the terminal mask, in a suitable solvent, such as acetone for example, and then the terminal portion may be rinsed using deionized water to remove the solvent. A gentle rub near the edge of the terminal portion using a suitable solvent, for example a methanol-soaked cleanroom cloth, may be performed prior to the deionized water rinse to remove any remaining acid residue. In some embodiments it may be unnecessary to remove edge mask 68 from non-terminal portions of edge gap 48.

At step 114, edge surfaces 32, 34 (e.g. any of edge surfaces 32*a-d* or edge surfaces 34*a-d*) may be protected by applying an edge surface coating 78 using whatever edge coating material best meets the need for the particular application, typically a polymer coating material. For example, a silica-filled coating such as Masterbond may be used. The edge surface coating thickness may be in a range from about 50 micrometers to about 75 micrometers. The edge surface coating material may be supplied first to an applicator pad. The applicator pad is preferably porous and resilient, for example a foam applicator pad. The application of an edge surface coating using an applicator pad is not particularly dependent on edge surface profiles or glass shape, and thus an applicator pad will work for different edge surface profiles and glass shapes. Moreover, foam easily conforms and does not allow the display to slip during the coating application.

In accordance with one method illustrated in FIGS. 11A through 11E, the edge surfaces 32, 34 of display panel 10 are coated by placing one corner of display panel 10 onto applicator pad 80, including the edge coating material, and then lowering the opposite corner down onto the applicator pad until the entire side of the display panel is touching the coating material-laden applicator pad. Next, the display panel is removed by lifting the first corner of the display panel out of the coating material slowly until the first corner is no longer in contact with the coating material-laden applicator pad 80. The display panel may then be removed from the applicator pad, leaving an edge coating 70 deposited on the display panel edge surfaces for that side. This process can be repeated for each side of the display panel.

A new section of applicator pad 80, with edge coating material, may be used for each subsequent use/edge coating if desired. Coverage of edge surface coating 78 over edge surfaces 32, 34 (e.g. 32a-34a, 32b-34b, 32c-34c or 32d-34d) can be inspected on a microscope or an on-line inspection system. Areas with coating skips or thin coating thickness can be recoated. The edge surface coating material may be cured by a method appropriate to the material. For example, if the edge coating material is a UV curable material, the edge coating material may be placed on or into, as the case may be, a UV cure machine. The display panel surface should be protected during the UV-cure process.

Figure 12A:
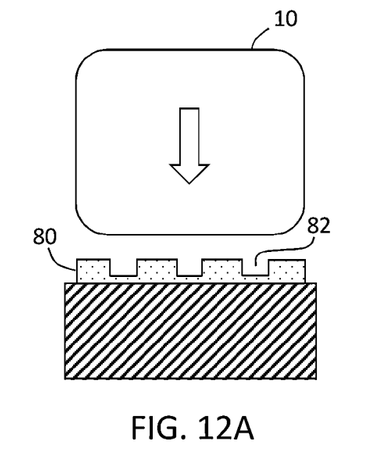
FIG. 12A-12B illustrate steps for depositing protective film to edge surfaces of a display panel.
Figure 12B:
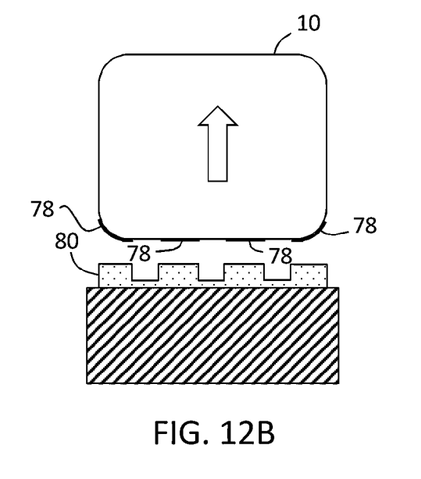

Applicator pad 80 may have patterns cut from the pad to allow regions of the edge surfaces that are not to be coated to not receive the coating material, for example, where the electrical terminal elements 42 are attached to terminal portion 40. The process in respect of FIGS. 11A through 11E can then be used, but modified such that any notches or cut-outs 82 are appropriately aligned with regions of the display panels edge surfaces that are not to receive edge surface coating material as illustrated in FIGS. 12A and 12B. Accordingly, such a "stepped" applicator pad can be used to coat recessed edge surface 34d of the second glass substrate.

Figure 13:
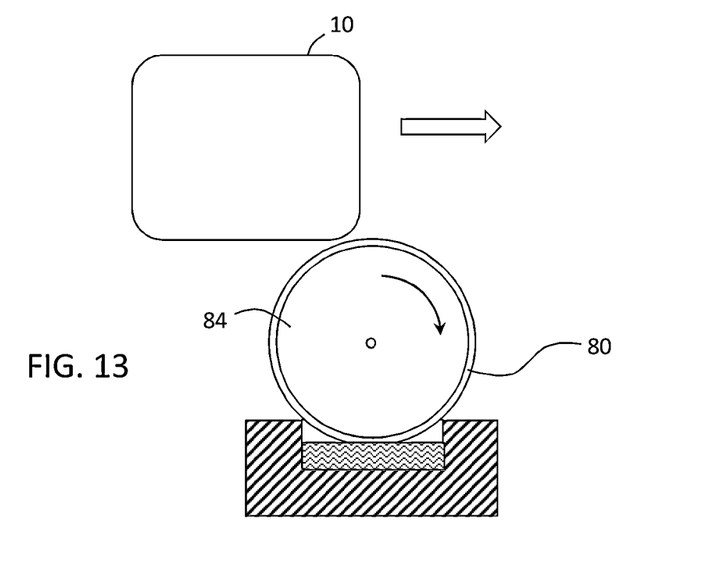
FIG. 13 illustrates another method for depositing protective film to edge surfaces of a display panel.
Figure 14:
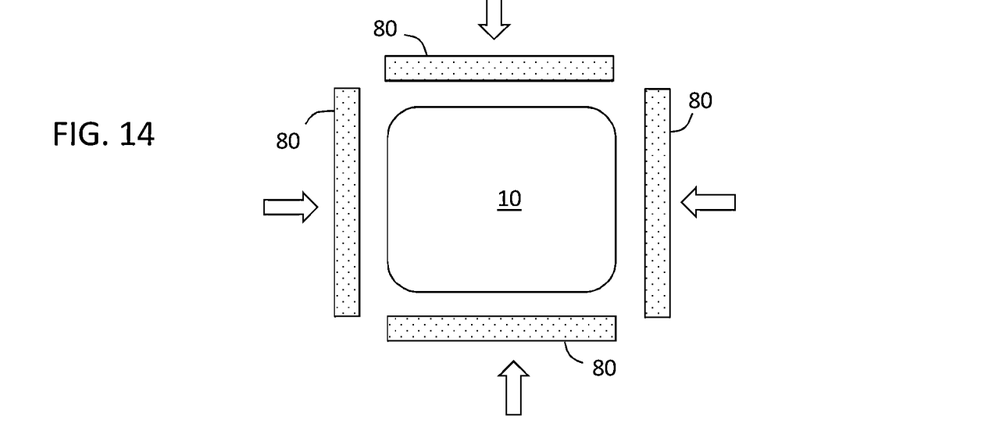
FIG. 14 is a top view illustrating another method for simultaneously depositing a protective film to edge surfaces of a display panel.

In some embodiments, applicator pad 80 can be positioned on a roll 84 for on-line edge surface coating application in a manufacturing setting as an alternative method as shown in FIG. 13. Several rolls can be used to coat multiple edge surface portions on multiple sides of the display panel simultaneously. Alternatively, multiple applicator pads 80 may be pressed against respective edge sections of the display panel simultaneously, for example four applicator pads 80 pressed against each of four sides of the display panel as depicted in FIG. 14.

Returning to process 100 and FIG. 5, at step 116, a polymer film, such as a polyethylene film, e.g. Visqueen, may be applied to protect the display panel against mechanical surface damage. This film i9s preferably removed prior to installation of the display panel into a display device. At step 118 the final display panel is protected and ready to ship or be installed into a device.

It will be apparent to those skilled in the art that various modifications and variations can be made to embodiments of the present disclosure without departing from the spirit and scope of the invention. For example, the processes described herein can be combined with the surface etching of mother display panels disclosed in U.S. Patent Publication No. 20130109116 filed on July 3, 20, the content of which is included herein in its entirety by reference. In other examples, the processes described herein can be applied to individual glass substrates, including flexible glass substrates, and in particular flexible glass substrates in a roll-to-roll process. Thus, it is intended that the present disclosure cover the modifications and variations of such embodiments provided they come within the scope of the appended claims and their equivalents.

What is claimed is:

1. A method of strengthening the edge of a glass substrate comprising:
    masking a display panel, the display panel comprising a first glass substrate and a second glass substrate spaced apart from the first glass substrate and sealed to the first glass substrate with a sealing material, the first glass substrate comprising a terminal portion extending beyond the second glass substrate and electrically conducting terminal members positioned on the terminal portion, the masking comprising depositing a terminal mask over the electrically conducting terminal members on the terminal portion;
    depositing a surface mask on exposed major surfaces of the display panel, wherein the surface mask is recessed from edges of the exposed major surfaces a predetermined distance; and
    exposing edge surfaces of the display panel to an acid solution for a time and at a temperature effective to remove no more than 20 micrometers of glass from the edge surfaces.

2. The method according to claim 1, wherein the acid solution comprises HF in a molar concentration in a range from about 1.5 M to about 6 M.

3. The method according to claim 2, wherein the acid solution comprises HCl in a molar concentration in a range from about 1 M to about 6 M.

4. The method according to claim 2, wherein the acid solution comprises HNO3 in a molar concentration in a range from about 1 M to about 6 M.

5. The method according to claim 2, wherein the acid solution comprises H2SO4 in a molar concentration in a range from about 1 M to about 6 M.

6. The method according to claim 2, wherein the acid solution comprises HF in a molar concentration in a range from about 3.5 to about 4.5 and HCl in a molar concentration in a range from about 3.5 M to about 4.5 M.

7. The method according to claim 1, wherein the acid solution is at a temperature in a range from about 19° C. to about 24° C.

8. The method according to claim 1, wherein the display panel comprises as-cut edges.

9. The method according to claim 1, wherein the terminal mask fills a gap between the first and second glass substrates adjacent the terminal portion after the depositing.

10. The method according to claim 1, wherein the terminal mask is deposited as a plurality of discrete line segments.

11. The method according to claim 1, wherein the surface mask is deposited on an ITO layer.

12. The method according to claim 1, wherein the predetermined distance is in a range from about 0.1 mm to about 0.5 mm.

13. The method according to claim 1, wherein the masking further comprises depositing an edge mask material in a gap between the first glass substrate and the second glass substrate along non-terminal portion sides of the display panel.

14. The method according to claim 13, wherein depositing the edge mask material comprises inserting an edge surface of the first glass substrate and an edge surface of the second glass substrate opposite the edge surface of the first glass substrate in an elongate channel containing the edge mask material such that the edge surface of the first glass substrate and the edge surface of the second glass substrate contact the edge mask material, and the edge mask material wicks into the gap between the first glass substrate and the second glass substrate.

15. The method according to claim 1, wherein the edge mask material is applied with a roller comprising a channel positioned around a perimeter of the roller.

16. The method according to claim 1, wherein a protective coating is applied to the edge surfaces after the etching.

17. The method according to claim 16, wherein applying the protective coating comprises contacting the edge surfaces of the display panel with an applicator pad.

18. The method according to claim 17, wherein the applicator pad comprises a roller.

19. A method of strengthening the edge of a glass substrate comprising:

masking a display panel, the display panel comprising a first glass substrate and a second glass substrate spaced apart from the first glass substrate and sealed to the first glass substrate with a sealing material, the first glass substrate comprising a terminal portion extending beyond the second glass substrate and electrically conducting terminal members positioned on the terminal portion, the masking comprising depositing a terminal mask over the electrically conducting terminal members on the terminal portion and depositing an edge mask material in a gap between the first glass substrate and the second glass substrate along non-terminal portion sides of the display panel; and exposing edge surfaces of the display panel to an acid solution for a time and at a temperature effective to remove no more than 20 micrometers of glass from the edge surfaces.

20. A method of strengthening the edge of a glass substrate comprising:

masking a display panel, the display panel comprising a first glass substrate and a second glass substrate spaced apart from the first glass substrate and sealed to the first glass substrate with a sealing material, the first glass substrate comprising a terminal portion extending beyond the second glass substrate and electrically conducting terminal members positioned on the terminal portion, the masking comprising depositing a terminal mask over the electrically conducting terminal members on the terminal portion;

exposing edge surfaces of the display panel to an acid solution for a time and at a temperature effective to remove no more than 20 micrometers of glass from the edge surfaces; and applying a protective coating to edge surfaces of the first and second glass substrates after the etching.

* * * * *